United States Patent
Kim

(10) Patent No.: US 10,576,992 B2
(45) Date of Patent: Mar. 3, 2020

(54) METHOD AND APPARATUS FOR CONTROLLING DRIVING MODE OF AUTONOMOUS DRIVING VEHICLE

(71) Applicants: Hyundai Motor Company, Seoul (KR); Kia Motors Corp., Seoul (KR)

(72) Inventor: Eun Sik Kim, Gwangmyeong-si (KR)

(73) Assignees: Hyndai Motor Company, Seoul (KR); Kia Motors Corp., Seoul (KR)

( * ) Notice: Subject to any disclaimer, the term of this patent is extended or adjusted under 35 U.S.C. 154(b) by 72 days.

(21) Appl. No.: 15/897,556

(22) Filed: Feb. 15, 2018

(65) Prior Publication Data

US 2019/0161092 A1 May 30, 2019

(30) Foreign Application Priority Data

Nov. 30, 2017 (KR) .................. 10-2017-0163748

(51) Int. Cl.

| *B60W 50/08* | (2020.01) |
| *B60W 50/16* | (2020.01) |
| *G05D 1/00*  | (2006.01) |
| *G05D 1/06*  | (2006.01) |
| *B60W 50/10* | (2012.01) |

(52) U.S. Cl.
CPC ........ *B60W 50/087* (2013.01); *B60W 50/082* (2013.01); *B60W 50/10* (2013.01); *B60W 50/16* (2013.01); *G05D 1/0088* (2013.01); *B60W 2520/10* (2013.01); *B60W 2540/04* (2013.01); *B60W 2540/10* (2013.01); *B60W 2550/22* (2013.01); *G05D 1/0061* (2013.01)

(58) Field of Classification Search
None
See application file for complete search history.

(56) References Cited

U.S. PATENT DOCUMENTS

| 9,073,429 | B2   | 7/2015  | Kim et al. |
| 9,511,779 | B2 * | 12/2016 | Cullinane ............. B60W 30/00 |
| 9,878,723 | B2 * | 1/2018  | Kim ..................... G05D 1/0061 |
| 2017/0109722 | A1 * | 4/2017 | Morris .................. G06Q 50/06 |
| 2019/0179309 | A1 * | 6/2019 | Mizutani ............... B60W 50/14 |

FOREIGN PATENT DOCUMENTS

| EP | 3091411 A1 * | 11/2016 | .......... B60W 50/082 |
| KR | 10-2010-0005362 A | 1/2010 | |
| KR | 10-2012-0053647 A | 5/2012 | |
| KR | 10-2012-0062491 A | 6/2012 | |

* cited by examiner

*Primary Examiner* — Abdhesh K Jha
(74) *Attorney, Agent, or Firm* — Morgan, Lewis & Bockius LLP

(57) ABSTRACT

A method for controlling a driving mode of an autonomous driving vehicle, may include comparing a current vehicle speed with a reference vehicle speed when a driving mode change signal is generated during driving of the autonomous driving vehicle in manual driving mode; stopping the manual driving mode and executing autonomous driving mode when a result of the comparing indicates that the current vehicle speed is equal to or slower than the reference vehicle speed; and executing the autonomous driving mode or maintaining the manual driving mode which is a current driving mode, depending on a determination result of whether an APS signal is generated or not, when the result of the comparing indicates that current vehicle speed exceeds the reference vehicle speed.

15 Claims, 2 Drawing Sheets

METHOD AND APPARATUS FOR CONTROLLING DRIVING MODE OF AUTONOMOUS DRIVING VEHICLE

CROSS REFERENCE TO RELATED APPLICATION

The present application claims priority to Korean Patent Application No. 10-2017-0163748, filed Nov. 30, 2017, the entire contents of which is incorporated herein for all purposes by this reference.

BACKGROUND OF THE INVENTION

Field of the Invention

The present invention relates to a method and apparatus configured for controlling a driving mode of an autonomous driving vehicle. More particularly, the present invention relates to a technology regarding a method and apparatus configured for controlling a driving mode of an autonomous vehicle, the technology being configured for securing driver safety when a driving mode switches from autonomous driving mode to manual driving mode.

Description of Related Art

An autonomous driving vehicle is a vehicle that can autonomously drive toward a destination without requiring a driver to operate a steering wheel, an accelerator pedal, and a brake. It is also called a smart vehicle and is developed by applying an autopilot technology that has been used in ships or airplanes to a vehicle.

In order to realize autonomous driving of a vehicle, in addition to vehicle-related technologies such as a highway driving assist (HDA) technology for automatically maintaining a safe distance between vehicles, a lane departure warning system (LDWS) technology, a lane keeping assist system (LKAS) technology, a blind spot detection (BSD) technology, an advanced smart cruising control (ASCC), technology, and an autonomous emergency braking (AEB) technology, other various advanced technologies such as a technology for communication between vehicles and base stations and between vehicles and satellites are also required.

An autonomous driving condition refers to a driving condition in which a driver does not step on any pedal (an accelerator pedal or a brake pedal). In an autonomous driving vehicle, when a driver steps on a pedal during autonomous driving, a vehicle controller determines that the driver does not want autonomous driving but wants to directly control the driving of the vehicle, whereby the vehicle controller stops controlling for autonomous driving.

However, in the case of a vehicle in which its autonomous driving is automatically stopped when a driver steps on a pedal, there is a problem that since pedals are disposed near driver's feet, a driver is likely to unintentionally step on a pedal (i.e. a pedal misapplication is likely to occur) during autonomous driving. In the present case, there is a risk of an accident, depending on traffic conditions or a distance between vehicles.

Meanwhile, in the case of a vehicle in which driving mode switching from manual driving mode to autonomous driving mode or from autonomous driving mode to manual driving is performed through operation of a button, there is a problem that unintentional driving mode switching is likely to occur due to a mistaken operation on a mode switching button or a problem that a driver may misrecognize a current driving mode during driving mode switching. This may result in a traffic accident.

Accordingly, a safety-related technology for preventing unintentional driving mode switching or for preventing a mistaken operation at the time of driving mode switching is required.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus configured for controlling a driving mode of an autonomous driving vehicle, the method and apparatus allowing driving mode switching from manual driving mode to autonomous driving mode or autonomous driving mode to manual driving mode only when an operation signal of a driving mode button, a vehicle speed, and an accelerator pedal sensor (APS) signal satisfy predetermined conditions, whereby the method and apparatus can secure driver safety at the time of driving mode switching.

Various aspects of the present invention are directed to providing a method and apparatus configured for facilitating a driver to accurately recognize a driving mode being changed by providing a tactile sensation signal to the driver via an accelerator pedal when driving mode switching occurs.

Various aspects of the present invention are directed to providing a method for controlling a driving mode of an autonomous driving vehicle, the method including: comparing a current vehicle speed with a reference vehicle speed when a driving mode change signal is generated during driving of the autonomous driving vehicle in manual driving mode; stopping the manual driving mode and executing autonomous driving mode when a result of the comparing indicates that the current vehicle speed is equal to or slower than the reference vehicle speed; and executing the autonomous driving mode or maintaining the manual driving mode which is a current driving mode, depending on a determination result of whether an APS signal is generated or not, when the result of the comparing indicates that current vehicle speed exceeds the reference vehicle speed.

When the result of the comparing indicates that the current vehicle speed exceeds the reference vehicle speed, an actuator provided in an accelerator pedal is operated to generate a tactile sensation signal, and when no APS signal is generated within a reference time after the tactile sensation signal is generated, the manual driving mode ends and the autonomous driving mode starts.

When the result of the comparing indicates that the current vehicle speed exceeds the reference vehicle speed, an actuator provided in an accelerator pedal is operated to generate a tactile sensation signal, and when the APS signal is generated within a reference time after the tactile sensation signal is generated, the manual driving mode is maintained.

When the driving mode change signal is generated through operation of a driving mode button, a driving mode controller receives a signal of the current vehicle speed from a speed detector, compares the current vehicle speed with the reference vehicle speed, and transmits either a manual driving mode execution signal or an autonomous driving mode execution signal to a vehicle controller such that manual driving or autonomous driving of the vehicle is performed by control of the vehicle controller.

When the result of the comparing indicates that the current vehicle speed exceeds the reference vehicle speed, the driving mode controller controls the actuator provided in the accelerator pedal such that the actuator generates any one of a vibration signal, a pedal effort signal, and a tick signal as a tactile sensation signal, then determines whether an APS signal is generated within a reference time after the tactile sensation signal is generated, and transmits the manual driving mode execution signal or the autonomous driving mode execution signal to the vehicle controller, depending on a result of the determination of whether the APS signal is generated or not.

Various aspects of the present invention are directed to providing a method for controlling a driving mode of an autonomous driving vehicle, the method including: comparing a current vehicle speed with a reference vehicle speed when a driving mode change signal is generated during driving of the autonomous driving vehicle in autonomous driving mode after the autonomous driving vehicle is started; stopping the autonomous driving mode and executing manual driving mode when a result of the comparing indicates that the current vehicle speed is equal to or slower than the reference vehicle speed; and executing the manual driving mode or maintaining the autonomous during mode which is a current driving mode, depending on a result of a determination of whether an APS signal is generated, when the result of the comparing indicates that the current vehicle speed exceeds the reference vehicle speed.

The method may further include: generating a tactile sensation signal by operating an actuator provided in an accelerator pedal when the result of the comparing indicates that the current vehicle speed exceeds the reference vehicle speed; and maintaining the current driving mode which is the autonomous driving mode when the APS signal is not generated within a reference time after the tactile sensation signal is generated.

The method may further include generating a tactile sensation signal by operating an actuator provided in an accelerator pedal when the result of the comparing indicates that the current vehicle speed exceeds the reference vehicle speed; and stopping the autonomous driving mode and executing the manual driving mode when the APS signal is generated within a reference time after the tactile sensation signal is generated.

When the driving mode change signal is generated through operation of a driving mode button, a driving mode controller receives a signal from a speed detector, compares the current vehicle speed with the reference vehicle speed when the driving mode change signal is generated, and transmits a manual driving mode execution signal or an autonomous driving mode execution signal to a vehicle controller, and the vehicle controller performs control such that the autonomous driving vehicle performs manual driving or autonomous driving.

When the result of the comparing indicates that current vehicle speed exceeds the reference vehicle speed, the driving mode controller controls an actuator provided in an accelerator pedal such that the actuator generates any one of a vibration signal, a pedal effect signal, and a tick signal as a tactile sensation signal, determines whether an APS signal is generated in the accelerator pedal within a reference time after the tactile sensation signal is generated, and transmits a manual driving mode execution signal or an autonomous driving mode execution signal to the vehicle controller, depending on a result of the determination of whether the APS signal is generated or not.

Various aspects of the present invention are directed to providing an apparatus configured for controlling a driving mode of an autonomous driving vehicle, the apparatus including: a driving mode button configured to generate a driving mode change signal when the driving mode button is pressed; a speed detector configured to detect vehicle speed information; an accelerator pedal provided with an actuator and an accelerator pedal sensor (APS) configured to generate a tactile sensation signal which is any one of a vibration signal, a pedal effect signal, and a tick signal; and a driving mode controller configured to generate and transmit either a manual driving mode execution signal or an autonomous driving mode execution signal, based on an operation signal of the driving mode button, the vehicle speed information related to the speed detector, and an APS signal of the accelerator pedal, to a vehicle controller.

In the apparatus, when the driving mode button generates the operation signal, the driving mode controller compares a current vehicle speed with a reference vehicle speed by referring to the vehicle speed information related to the speed detector. When a result of the comparison indicates that the current vehicle speed is equal to or slower than the reference vehicle speed, the driving mode controller transmits an execution signal of a driving mode opposite to a current driving mode to the vehicle controller.

In the apparatus, when the current vehicle speed is equal to or slower than the reference vehicle speed and when the current driving mode is manual driving mode, the driving mode controller transmits the autonomous driving mode execution signal to the vehicle controller. Meanwhile, when the current vehicle speed is equal to or slower than the reference vehicle speed and when the current driving mode is autonomous driving mode, the driving mode controller transmits the manual driving mode execution signal to the vehicle controller.

In the apparatus, when the driving mode button generates the operation signal, the driving mode controller compares a current vehicle speed with a reference vehicle speed by referring to the vehicle speed information detected by the speed detector. Furthermore, when a result of the comparison indicates that the current vehicle speed exceeds the reference vehicle speed, the driving mode controller transmits an operation signal to an actuator provided in an accelerator pedal such that the actuator generates any one of a vibration signal, a pedal effect signal, or a tick signal as a tactile sensation signal, then determines whether the APS signal is generated within a reference time after the tactile sensation signal is generated, and transmits the autonomous driving mode execution signal or the manual driving mode execution signal to the vehicle controller, depending on a result of the determination.

In the apparatus, when a current driving mode of the autonomous driving vehicle is manual driving mode and when the APS signal is generated in the accelerator pedal within the reference time after the tactile sensation signal is generated, the driving mode controller transmits the manual driving mode execution signal to the vehicle controller so that the current manual driving mode is maintained.

In the apparatus, when a current driving mode of the autonomous driving vehicle is manual driving mode and when the APS signal is not generated in the accelerator pedal within the reference time after the tactile sensation signal is generated, the driving mode controller transmits the autonomous driving mode execution signal to the vehicle controller.

In the apparatus, when a current driving mode of the autonomous driving vehicle is autonomous driving mode and when the APS signal is generated in the accelerator pedal within the reference time after the tactile sensation signal is generated, the driving mode controller transmits the manual driving mode execution signal to the vehicle controller.

In the apparatus, when a current driving mode of the vehicle mode is autonomous driving mode and when the APS signal is not generated in the accelerator pedal within the reference time after the tactile sensation signal is generated, the driving mode controller transmits the autonomous driving mode execution signal to the vehicle controller so that the current autonomous driving mode is maintained.

According to the exemplary embodiments of the present invention, in regards to driving mode switching, only when the operation signal of the driving mode button, the vehicle speed, and the APS signal satisfy predetermined conditions, switching from the manual driving mode to the autonomous driving mode or from the autonomous driving mode to the manual driving mode is allowed. Due to the present technology, it is possible to secure driver safety at the time of driving mode switching.

Furthermore, in various aspects of the present invention, the tactile sensation signal is transferred to a driver via the accelerator pedal when the driving mode is changed. Therefore, the driver can accurately recognize the change in the driving mode.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
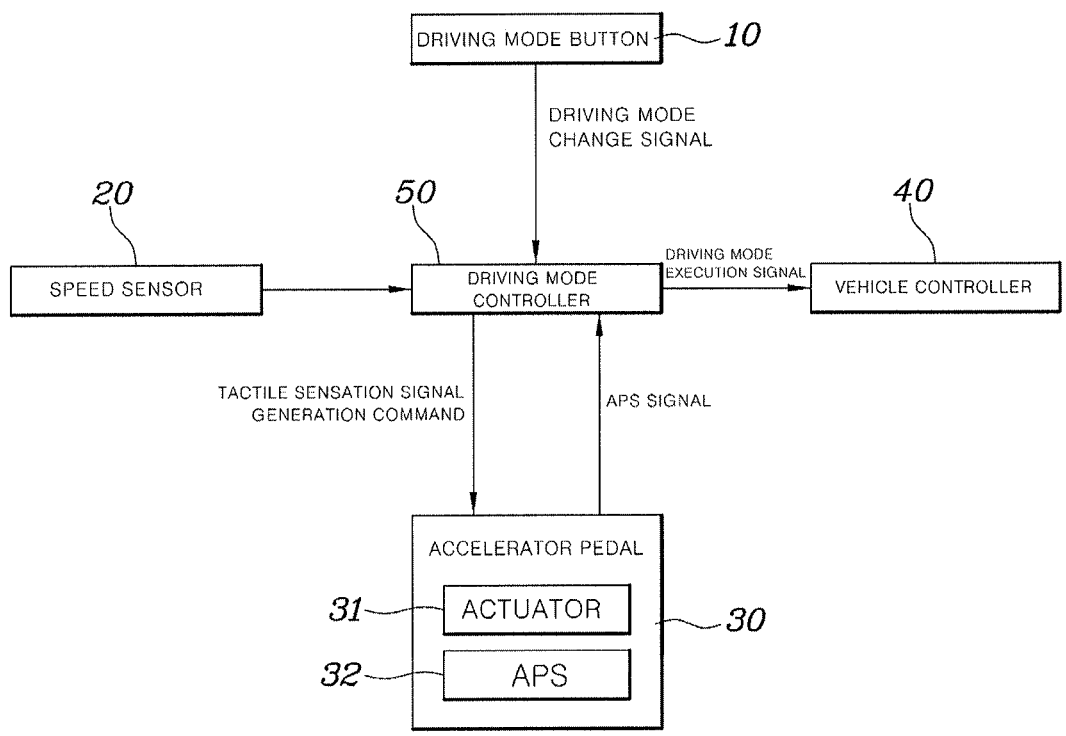
FIG. 1 is a block diagram illustrating the construction of an apparatus configured for controlling a driving mode of an autonomous driving vehicle, according to one exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the contrary, the invention(s) is/are intended to cover not only the exemplary embodiments of the present invention, but also various alternatives, modifications, equivalents and other embodiments, which may be included within the spirit and scope of the invention as defined by the appended claims.

Hereinbelow, exemplary embodiments of a vehicle driving mode controlling method according to an exemplary embodiment of the present invention will be described more specifically with reference to the accompanying drawings.

According to one exemplary embodiment of the present invention, as illustrated in FIG. 1, an apparatus configured for controlling a driving mode of an autonomous driving vehicle includes: a driving mode button 10 generating a driving mode change signal when pressed; a speed detector 20 detecting vehicle speed information; an accelerator pedal 30 provided with an actuator 31 generating a vibration signal, a pedal effort signal, or a tick signal as a tactile sensation signal and with an accelerator pedal sensor (APS); and a driving mode controller 50 generating either a manual driving mode execution signal or an autonomous driving mode execution signal on the basis of an operation signal output from the driving mode button 10, the vehicle speed information output from the speed detector 20, and an APS signal output from the accelerator pedal 30.

The driving mode button 10 may have a structure in which an autonomous driving mode button and a manual driving mode button are separately provided. In the instant case, when the autonomous driving mode button is operated, an autonomous driving mode signal is generated as the driving mode change signal. In contrast, when the manual driving mode button is operated, a manual driving mode signal is generated as the driving mode change signal. The driving mode controller 50 receives the driving mode change signal when the driving mode button 10 is operated.

Alternatively, the driving mode button 10 may be provided as one button. In the instant case, for example, when the driving mode button is pressed once, one of the manual driving mode signal and the autonomous driving mode is generated as the driving mode change signal. Meanwhile, when the driving mode button is pressed twice, the driving mode change signal for performing a driving mode opposite to a current driving mode is generated.

The actuator 31 provided in the accelerator pedal 30 is a motor which is operated and controlled by the driving mode controller 50. When the actuator 31 is operated, any one of a vibration signal, a pedal effort signal, and a tick signal is generated as the tactile sensation signal in the accelerator pedal 30. The tactile sensation signal is transferred to the driver foot stepping on the accelerator pedal 30.

The accelerator pedal detector 32 provided in the accelerator pedal 30 generates the APS signal when the driver steps on the accelerator pedal 30. The APS signal is transmitted to the driving mode controller 50. When the accelerator pedal 30 is not pressed, i.e., when the foot of a driver is merely placed on or touches the accelerator pedal 30 without pressing the accelerator pedal 30, the APS signal is not generated. That is, in a state in which the foot is separated from the accelerator pedal 30, the APS signal is not generated.

A vehicle controller 40 receives a control signal from the driving mode controller 50 and controls operation of various driving devices including a braking device and a chassis device in accordance with the control signal such that the autonomous driving vehicle drives autonomously or through manual operation.

Figure 2:
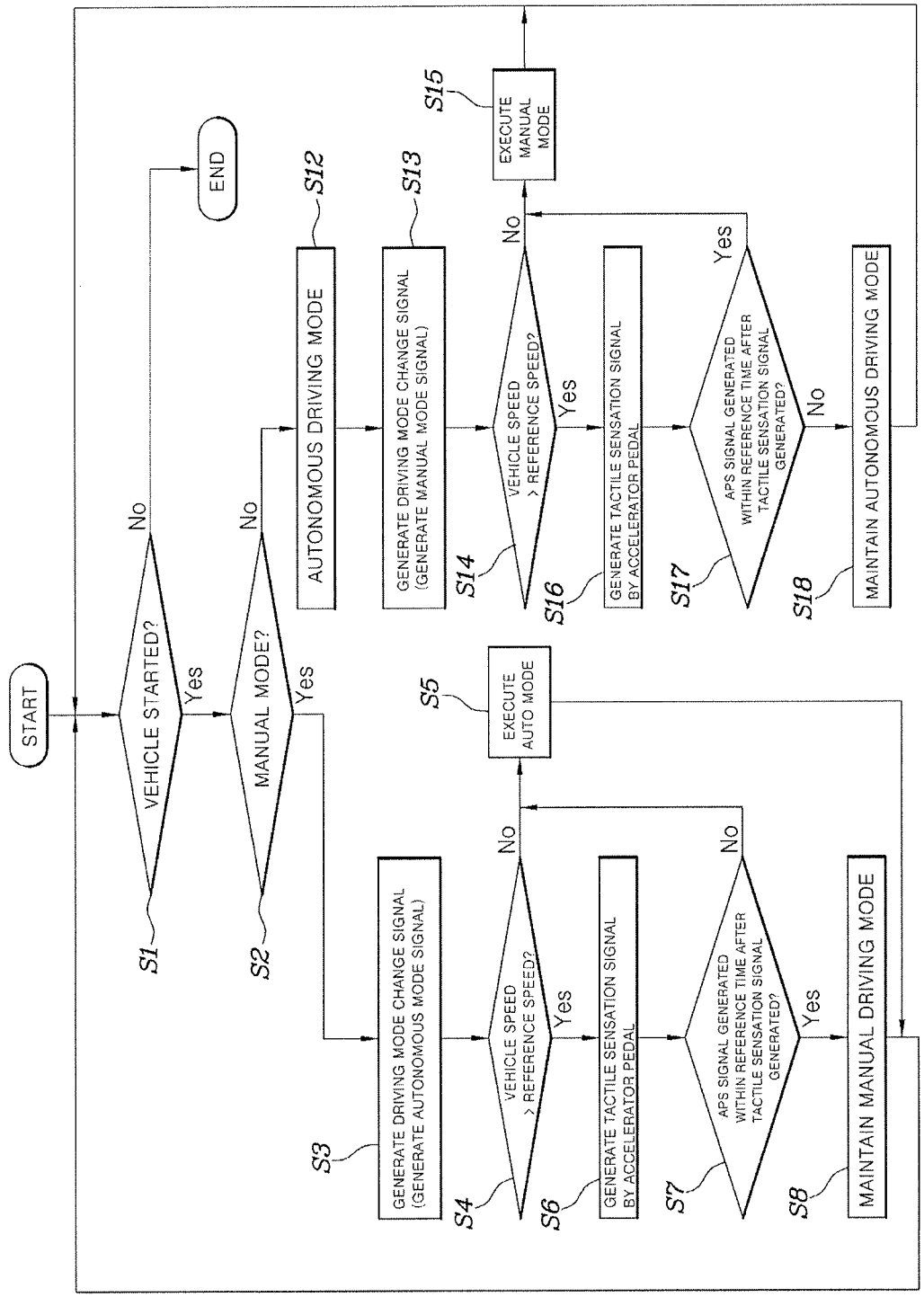
FIG. 2 is a flowchart illustrating a method of controlling a driving mode of an autonomous driving vehicle, according to one exemplary embodiment of the present invention.

Hereinbelow, operation of the controlling apparatus according to an exemplary embodiment of the present invention will be briefly described. A specific process of controlling a driving mode using the controlling apparatus according to an exemplary embodiment of the present invention will be described below with reference to FIG. 2.

When the driving mode button 10 generates the operation signal, the controlling apparatus according to an exemplary embodiment of the present invention compares a current vehicle speed with a reference vehicle speed by referring to the vehicle speed information detected by the speed detector 20. When it is determined that the current vehicle speed is equal to or slower than the reference vehicle speed, the driving mode controller 50 transmits an execution signal of a driving mode which is opposite to a current driving mode, to the vehicle controller.

The reference vehicle speed means a low speed state in which driving mode switching can be safely performed. The reference vehicle speed may be defined as a parked state or a temporary stop state in which the vehicle speed is 0 (zero) Km/h or a state in which the vehicle speed is 10 Km/h or lower.

When the current vehicle speed is equal to or slower than the reference vehicle speed and when the current driving mode of the vehicle is manual driving mode, the driving mode controller 50 transmits the autonomous driving mode execution signal to the vehicle controller 40. Meanwhile, when the current vehicle speed is equal to or slower than the reference vehicle speed and the current driving mode of the vehicle is autonomous driving mode, the driving mode controller 50 transmits the manual driving mode execution signal to the vehicle controller 40.

When the driving mode button 10 generates the operation signal, the driving mode controller 50 compares the current vehicle speed of the vehicle with the reference vehicle speed by referring to the vehicle speed information provided by the speed detector 20. When the result of the comparison indicates that the current vehicle speed exceeds the reference vehicle speed, the driving mode controller 50 transmits an operation signal to the actuator 31 provided in the accelerator pedal 30 so that a tactile sensation signal which is any one of a vibration signal, a pedal effort signal, and a tick signal is generated by the actuator in the accelerator pedal 30. The driving mode controller 50 then determines whether the APS signal is generated in the accelerator pedal 30 within a reference time after the tactile sensation signal is generated, and transmits either one of the manual driving mode execution signal and the autonomous driving mode execution signal to the vehicle controller 40, depending on a result of the determination.

The reference time is preferably a period of three to five seconds, but it may not be limited thereto.

According to various exemplary embodiments of the present invention, when the current driving mode of a vehicle is the manual driving mode and when the APS signal is generated in the accelerator pedal 30 within the reference time after the tactile sensation signal is generated, the driving mode controller 50 transmits the manual driving mode execution signal to the vehicle controller 40 such that the manual driving mode which is the current driving mode is maintained.

According to various exemplary embodiments of the present invention, when the current driving mode is the manual driving mode and when the APS signal is not generated in the accelerator pedal 30 within the reference time after the tactile sensation signal is generated, the driving mode controller 50 transmits the autonomous driving mode execution signal to the vehicle controller 40.

According to various exemplary embodiments of the present invention, when the current driving mode of the vehicle is the autonomous driving mode and when the APS signal is generated in the accelerator pedal 30 within the reference time after the tactile sensation signal is generated, the driving mode controller 50 transmits the manual driving mode execution signal to the vehicle controller 40.

According to various exemplary embodiments of the present invention, when the current driving mode of the vehicle is the autonomous driving mode and when the APS signal is not generated in the accelerator pedal 30 within the reference time after the tactile sensation signal is generated, the driving mode controller 50 transmits the autonomous driving mode execution signal to the vehicle controller 40 such that the autonomous driving mode which is the current driving mode is maintained.

Next, a method for controlling a driving mode of an autonomous driving vehicle by use of the controlling apparatus according to an exemplary embodiment of the present invention will be described. First, the controlling method for the case where a current driving mode is manual driving mode will be described first with reference to FIG. 1 and FIG. 2.

A method for controlling a driving mode of an autonomous driving vehicle, according to one exemplary embodiment of the present invention, includes: a first process of comparing a current vehicle speed with a reference vehicle speed when a driving mode change signal is generated while the autonomous driving vehicle is driving in manual driving mode after being started; a second process of stopping the manual driving mode and executing autonomous driving mode when a result of the comparison in the first process indicates that the current vehicle speed is equal to or slower than the reference vehicle speed; and a third step of executing the autonomous driving mode or maintaining the manual driving mode which is the current driving mode of the vehicle, depending on a result of determination of whether an APS signal is generated when the result of the comparison in the first process indicates that the current vehicle speed exceeds the reference vehicle speed.

The reference vehicle speed means a low speed state in which driving mode switching can be safely performed. The reference vehicle speed may be defined as a parked state or a temporary stopped state in which the vehicle speed is 0 (zero) Km/h or a state in which the vehicle speed is 10 Km/h or lower.

When the result of the comparison in the first process indicates that the current vehicle speed exceeds the reference vehicle speed, the actuator 31 provided in the accelerator pedal 30 is operated to generate a tactile sensation signal. In the instant case, when the APS signal is not generated within a reference time after the tactile sensation signal is generated, the manual driving mode is stopped and the autonomous driving mode is executed.

The reference time is preferably a period of three to five seconds, but it is not limited thereto.

When the result in the comparison in the first process indicates that the current vehicle speed exceeds the reference vehicle speed, the actuator 31 provided in the accelerator pedal 30 is operated to generate the tactile sensation signal. In the instant case, when the APS signal is generated within the reference time after the tactile sensation signal is generated, the current driving mode, i.e., the manual driving mode, is maintained.

A driving mode change signal is generated through operation of the driving mode button 10. When the driving mode change signal is generated, the driving mode controller 50 receives a signal of the speed detector 20 and compares the current vehicle speed with the reference vehicle speed. The driving mode controller 50 transmits a manual driving mode execution signal or an autonomous driving mode execution signal to the vehicle controller 40. Thus, the vehicle controller 40 performs control such that either manual driving or autonomous driving is performed.

Meanwhile, when the result of the comparison in the first process indicates that the current vehicle speed exceeds the reference vehicle speed, the driving mode controller 50 controls the actuator 31 provided in the accelerator pedal 30 such that the actuator 31 generates a vibration signal, a pedal effort signal, or a tick signal as a tactile sensation signal, then determines whether an APS signal is generated in the accelerator pedal 30 within a reference time after the tactile sensation signal is generated, and generates and transmits a manual driving mode execution signal or an autonomous driving mode execution signal to the vehicle controller 40, depending on a result of the determination.

Next, a method for controlling a driving mode for the case where the current driving mode of the autonomous driving vehicle is the autonomous driving mode will be described.

The method for controlling a driving mode of an autonomous driving vehicle, according to an exemplary embodiment of the present invention, includes: a fourth process of comparing the current vehicle speed with the reference vehicle speed when the driving mode change signal is generated while the vehicle is driving in the autonomous driving mode; a fifth process of stopping the autonomous driving mode and executing the manual driving mode when a result of the comparison in the fourth process indicates that the current vehicle speed is equal to or slower than the reference vehicle speed; and a sixth process of executing the manual driving mode or maintaining the current driving mode (i.e., the autonomous driving mode), depending on the presence and absence of the APS signal when the result of the comparison in the fourth process indicates that the current vehicle speed exceeds the reference vehicle speed.

When the result of the comparison in the fourth process indicates that the current vehicle speed exceeds the reference vehicle speed, the actuator 31 provided in the accelerator pedal 30 is operated to generate the tactile sensation signal. In the instant case, when the APS signal is not generated within the reference time after the tactile sensation signal is generated, the current driving mode of the autonomous driving mode is maintained.

When the result of the comparison in the fourth process indicates that the current vehicle speed exceeds the reference vehicle speed, the actuator 31 provided in the accelerator pedal 30 is operated to generate the tactile sensation signal. In the instant case, when the APS signal is generated within the reference time after the tactile sensation signal is generated, the autonomous driving mode is stopped and the manual driving mode is executed.

The driving mode change signal is generated through operation of the driving mode button 10. When the driving mode change signal is generated, the driving mode controller 50 receives a signal of the speed detector 20, and compares the current vehicle speed of the vehicle with the reference vehicle speed. The driving mode controller 50 transmits either the manual driving mode execution signal or the autonomous driving mode execution signal to the vehicle controller 40 and the vehicle controller 40 controls the vehicle such that manual driving or autonomous driving is performed.

When the result of the comparison in the fourth process indicates that the current vehicle speed exceeds the reference vehicle speed, the driving mode controller 50 controls the actuator 31 provided in the accelerator pedal 30 such that the actuator 31 generates any one of a vibration signal, a pedal effort signal, or a tick signal as the tactile sensation signal, and then determines whether the APS signal is generated in the accelerator pedal 30 within the reference time after the tactile sensation signal is generated, and finally generates and transmits either the manual driving mode execution signal or the autonomous driving mode execution signal to the vehicle controller 40, depending on a result of the determination.

Hereinbelow, a driving mode control process of an autonomous driving vehicle, according to an exemplary embodiment of the present invention, will be described below. First, the process for the case where a current driving mode of the vehicle is manual driving mode will be described.

When the vehicle is started (i.e., an ignition key of a vehicle is turned on (Step S1), the driving mode controller 50 determines whether a current driving mode of the vehicle is the manual driving mode (Step S2). In the case where the current driving mode is determined as being the manual driving mode, when a driver operates the driving mode button 10 to generate the driving mode change signal (autonomous driving mode signal) (Step S3), the driving mode controller 50 compares the information related to the current vehicle speed transmitted by the speed detector 20 with the reference vehicle speed (Step S4).

The reference vehicle speed is a low speed state in which the vehicle speed is 10 Km/h or slower. In the case of driving mode switching from the manual driving mode to the autonomous driving mode after the vehicle is started, it is safer that the driving mode switching is performed at low speed of the vehicle.

When the result of the comparison in Step S4 indicates that the current vehicle speed is equal to or slower than the reference vehicle speed, the driving mode controller 50 determines that a condition in which the driving mode switching from the manual driving mode to the autonomous driving mode is satisfied. Therefore, the driving mode controller 50 transmits an autonomous driving mode execution signal to the vehicle controller 40 and thus the vehicle controller 40 performs control such that the autonomous driving of the autonomous driving vehicle is performed (Step S5).

When the result of the comparison in the Step S4 indicates that the current vehicle speed exceeds the reference vehicle speed, the driving mode controller 50 transmits an operation signal to the actuator 31 provided in the accelerator pedal 30. Therefore, the actuator 31 generates any one of a vibration signal, a pressure effort signal, and a tick signal as a tactile sensation signal under the control of the driving mode controller 50 (Step S6). The driver feels the tactile sensation signal generated in the accelerator pedal 30, accurately recognizing a state in which the driving mode is being changed.

In the case where the driving mode controller 50 transmits the operation signal to the actuator 31 provided in the accelerator pedal 30 and thus the tactile sensation signal is generated, the driving mode controller 50 determines whether the APS signal is generated in the accelerator pedal 30 within the reference time after the tactile sensation signal is generated (Step S7).

The reference time may be a period of three to five seconds, but it may not be limited thereto.

In Step S7, when the driving mode controller 50 determines that the APS signal is generated in the accelerator pedal 30 within the reference time, the driving mode controller 50 transmits a manual driving mode execution signal to the vehicle controller 40. Thus, the vehicle controller 40 performs control such that the manual driving mode of the vehicle is maintained (Step S8).

The determination result that the APS signal is generated means an event in which the driver steps on the accelerator pedal 30. Therefore, the driving mode controller 50 determines that the driver wants to drive the vehicle through manual operation. In the instant case, the driving mode controller 50 determines that the driving mode change signal generated due to the driver operating the driving mode button 10 as an erroneous signal generated by unintentional mis-operation of the driver.

Accordingly, when the current driving mode is the manual driving mode and when the APS signal is generated in the accelerator pedal 30 within the reference time after the tactile sensation signal is generated, the driving mode controller 50 transmits the manual driving mode execution signal to the vehicle controller 40, maintaining the manual driving mode which is the current driving mode.

Conversely, when the driving mode controller 50 determines that the APS signal is not generated in the accelerator pedal 30 in Step S7, the driving mode controller 50 transmits the autonomous driving mode execution signal to the vehicle controller 40, whereby the vehicle controller 40 performs control to execute the autonomous driving mode (Step S5).

A condition in which the APS signal is not generated means that the foot of the driver simply touches the accelerator pedal 30 rather than works on the accelerator pedal 30, i.e. a state in which the foot of the driver does not apply any pressing force to the accelerator pedal 30 or releases the accelerator pedal 30. Therefore, the driving mode controller 50 determines that the driver wants to change the driving mode from the manual driving mode to the autonomous driving mode in the present condition.

Accordingly, when the current driving mode is the manual driving mode and when the APS signal is not generated in the accelerator pedal 30 within the reference time after the tactile sensation signal is generated, the driving mode controller 50 transmits the autonomous driving mode execution signal to the vehicle controller 40, so that the driving mode of the vehicle is changed to the autonomous driving mode.

Next, a driving mode control process for the case where the current driving mode is the autonomous driving mode will be described.

When the driving mode controller 50 determines that the current driving mode is the autonomous driving mode (Step S12) based on the result of the determination of Step S2 and when the driver operates the driving mode button 10 to generate a driving mode change signal (i.e., manual driving mode signal) while the vehicle drives in the autonomous driving mode (Step S13), the driving mode controller 50 compares information related to a current vehicle speed provided by the speed detector 20 with a reference vehicle speed (Step S14)

The result of the comparison in the Step S14 indicates that the current vehicle speed is equal to or slower than the reference vehicle speed, the driving mode controller 50 determines that a condition in which the autonomous driving mode can be changed to the manual driving mode is satisfied. Thus, the driving mode controller 50 transmits the manual driving mode execution signal to the vehicle controller 40, and, as a result, the manual driving mode is executed under the control of the vehicle controller 40 (Step S15).

When the result of the comparison in the Step S14 indicates that the current vehicle speed exceeds the reference vehicle speed, the driving mode controller 50 transmits an operation signal to the actuator 31 provided in the accelerator pedal 30 such that the actuator 31 generates any one of a vibration signal, a pedal effort signal, and a tick signal as a tactile sensation signal under the control of the driving mode controller 50 (Step S16). Therefore, the driver can detect the tactile sensation signal generated in the accelerator pedal 30 via his/or foot, accurately recognizing a state in which the driving mode is being changed.

Meanwhile, when the driving mode controller 50 transmits the operation signal to the actuator 31 provided in the accelerator pedal 30 and when the tactile sensation signal is generated in a response to the operation signal, the driving mode controller 50 determines whether the APS signal is generated in the accelerator pedal 30 within the reference time after the tactile sensation signal is generated (Step S17).

In Step S17, when the driving mode controller 50 determines that the APS signal is generated in the accelerator pedal 30, the driving mode controller 50 transmits the manual driving mode execution signal to the vehicle controller 40. Therefore, the vehicle controller 40 performs control such that the vehicle drives in the manual driving mode (Step S15).

An event in which the APS signal is generated means a state in which the driver steps on the accelerator pedal 30. Therefore, in the instant case, the driving mode controller 50 determines that the driver agrees with mode switching from the autonomous driving mode to the manual driving mode.

Accordingly, when the current driving mode is the autonomous driving mode and when the APS signal is generated in the accelerator pedal 30 within the reference time after the tactile sensation signal is generated, the driving mode controller 50 transmits the manual driving mode execution signal to the vehicle controller 40, so that the driving mode switching from the autonomous driving mode to the manual driving mode occurs.

Conversely, when the driving mode controller 50 determines that no APS signal is generated in the accelerator pedal 30 in Step S17, the driving mode controller 50 transmits the autonomous driving mode execution signal to the vehicle controller 40. As a result, the vehicle controller 40 maintains the autonomous driving mode which is the current driving mode (Step S18).

An event in which no APS signal is generated means a state in which the foot of the driver simply touches the accelerator pedal 30, i.e. a state in which pedal effort is not applied to the accelerator pedal 30, or a state in which the foot of the driver is separated from the accelerator pedal 30. Therefore, the driving mode controller 50 determines that the driver wants to drive in the autonomous driving mode. In the instant case, the driving mode controller 50 determines that the driving mode change signal generated due to the driver operating the driving mode button 10 as an erroneous signal generated by unintentional mis-operation of the driver.

Accordingly, when the current driving mode of the vehicle is the autonomous driving mode and when no APS signal is generated in the accelerator pedal 31 within the reference time after the tactile sensation signal is generated, the driving mode controller 50 transmits the autonomous driving mode execution signal to the vehicle controller 40 so that the autonomous driving mode, i.e., the current driving mode, can be maintained.

As described above, the present invention is configured to allow the driving mode switching of the autonomous driving vehicle from the manual driving mode to the autonomous driving mode or from the autonomous driving mode to the manual driving mode only when the operation signal output from the driving mode button 10 and the APS signal generated in the accelerator pedal satisfy predetermined conditions. Therefore, the present invention has an advantage of securing safe driving at the time of switching between driving modes.

Furthermore, the present invention is configured such that the tactile sensation signal is transferred to the driver foot via the accelerator pedal 30 when the driving mode is changed. Therefore, there is an advantage that the driver can accurately recognize a state in which the driving mode is being changed.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a driving mode of an autonomous driving vehicle, the method comprising:
    comparing a current vehicle speed with a reference vehicle speed when a driving mode change signal is generated during driving of the autonomous driving vehicle in a manual driving mode;
    stopping the manual driving mode and executing an autonomous driving mode when a result of the comparing indicates that the current vehicle speed is equal to or slower than the reference vehicle speed; and
    executing the autonomous driving mode or maintaining the manual driving mode which is a current driving mode, depending on a determination result of whether an accelerator pedal sensor (APS) signal is generated or not, when the result of the comparing indicates that the current vehicle speed exceeds the reference vehicle speed,
    wherein the driving mode change signal is generated through operation of a driving mode button,
    wherein when the driving mode change signal is generated, a driving mode controller is configured to receive a signal of the current vehicle speed from a speed detector, and configured to compare the current vehicle speed with the reference vehicle speed, and
    wherein when the result of the comparing indicates that the current vehicle speed exceeds the reference vehicle speed, the driving mode controller is configured to control an actuator provided in an accelerator pedal, and wherein the actuator generates one of a vibration signal, a pedal effort signal, and a tick signal as a tactile sensation signal, then is configured to determine whether the APS signal is generated within a reference time after the tactile sensation signal is generated, and transmits a manual driving mode execution signal or an autonomous driving mode execution to a vehicle controller, depending on a result of the determination of whether the APS signal is generated or not.

2. The method according to claim 1, wherein when the result of the comparing indicates that the current vehicle speed exceeds the reference vehicle speed, the actuator provided in the accelerator pedal is operated to generate the tactile sensation signal; and
    wherein when no APS signal is generated within the reference time after the tactile sensation signal is generated, the manual driving mode ends and the autonomous driving mode starts.

3. The method according to claim 2,
    wherein when the result of the comparing indicates that the current vehicle speed exceeds the reference vehicle speed, the actuator provided in the accelerator pedal is operated to generate the tactile sensation signal, and
    wherein when the APS signal is generated within the reference time after the tactile sensation signal is generated, the manual driving mode is maintained.

4. The method according to claim 2, wherein
    the driving mode controller is configured to transmit either the manual driving mode execution signal or the autonomous driving mode execution signal to the vehicle controller, and wherein manual driving or autonomous driving of the autonomous driving vehicle is performed by control of the vehicle controller.

5. A method for controlling a driving mode of an autonomous driving vehicle, the method comprising:
    comparing a current vehicle speed with a reference vehicle speed when a driving mode change signal is generated during driving of the autonomous driving vehicle in an autonomous driving mode after the autonomous driving vehicle is started;
    stopping the autonomous driving mode and executing a manual driving mode when a result of the comparing indicates that the current vehicle speed is equal to or slower than the reference vehicle speed; and
    executing the manual driving mode or maintaining the autonomous driving mode which is a current driving mode, depending on a result of a determination of whether an accelerator pedal sensor (APS) signal is generated, when the result of the comparing indicates that the current vehicle speed exceeds the reference vehicle speed,
    wherein the driving mode change signal is generated through operation of a driving mode button,
    wherein when the driving mode change signal is generated, a driving mode controller is configured to receive a signal from a speed detector, configured to compare the current vehicle speed with the reference vehicle speed,
    wherein when the result of the comparing indicates that current vehicle speed exceeds the reference vehicle speed, the driving mode controller is configured to control an actuator provided in an accelerator pedal such that the actuator generates one of a vibration signal, a pedal effect signal, and a tick signal as a tactile sensation signal, configured to determine whether the APS signal is generated in the accelerator pedal within a reference time after the tactile sensation signal is generated, and configured to transmit a manual driving mode execution signal or an autonomous driving mode execution signal to a vehicle controller, depending on a result of the determination of whether the APS signal is generated or not.

6. The method according to claim 5, further including: generating the tactile sensation signal by operating the actuator provided in the accelerator pedal when the result of the comparing indicates that the current vehicle speed exceeds the reference vehicle speed; and, maintaining the current driving mode which is the autonomous driving mode when the APS signal is not generated within the reference time after the tactile sensation signal is generated.

7. The method according to claim 5, further including: generating the tactile sensation signal by operating the actuator provided in the accelerator pedal when the result of the comparing indicates that the current vehicle speed exceeds the reference vehicle speed; and stopping the autonomous driving mode and executing the manual driving mode when the APS signal is generated within the reference time after the tactile sensation signal is generated.

8. The method according to claim 5, wherein the driving mode controller 15 configured to transmit a manual driving mode execution signal or an autonomous driving mode execution signal to the vehicle controller, and
the vehicle controller performs control such that the autonomous driving vehicle performs manual driving or autonomous driving.

9. An apparatus configured for controlling a driving mode of an autonomous driving vehicle, the apparatus comprising:
a driving mode button configured to generate a driving mode change signal when the driving mode button is pressed;
a speed detector configured to detect vehicle speed information;
an accelerator pedal provided with an actuator and an accelerator pedal detector (APS) configured to generate a tactile sensation signal which is one of a vibration signal, a pedal effect signal, and a tick signal; and
a driving mode controller configured to generate and transmit either a manual driving mode execution signal or an autonomous driving mode execution signal, based on an operation signal of the driving mode button, the vehicle speed information related to the speed detector, and an APS signal of the accelerator pedal, to a vehicle controller,
wherein when the driving mode button generates the operation signal, the driving mode controller is configured to compare a current vehicle speed with a reference vehicle speed by, referring to the vehicle speed information related to the speed detector; and
wherein when a result of the comparison indicates that the current vehicle speed is equal to or slower than the reference vehicle speed, the driving mode controller transmits an execution signal of a driving mode opposite to a current driving mode to the vehicle controller.

10. The apparatus according to claim 9, wherein when the current vehicle speed is equal to or slower than the reference vehicle speed and the current driving mode is a manual driving mode, the driving mode controller transmits the autonomous driving mode execution signal to the vehicle controller, and
wherein when the current vehicle speed is equal to or slower than the reference vehicle speed and the current driving mode is an autonomous driving mode, the driving mode controller transmits the manual driving mode execution signal to the vehicle controller.

11. The apparatus according to claim 9,
wherein when the driving mode button generates the operation signal, the driving mode controller is configured to compare the current vehicle speed with the reference vehicle speed by referring to the vehicle speed information detected by the speed detector, and
wherein when the result of the comparison indicates that the current vehicle speed exceeds the reference vehicle speed, the driving mode controller is configured to transmit an operation signal to the actuator provided in the accelerator pedal such that the actuator generates one of the vibration signal, the pedal effect signal, or the tick signal as the tactile sensation signal, then configured to determine whether the APS signal is generated within a reference time after the tactile sensation signal is generated, and configured to transmit the autonomous driving mode execution signal or the manual driving mode execution signal to the vehicle controller, depending on a result of the determination.

12. The apparatus according to claim 11, wherein when a current driving mode of the autonomous driving vehicle is a manual driving mode and when the APS signal is generated in the accelerator pedal within the reference time after the tactile sensation signal is generated, the driving mode controller transmits the manual driving mode execution signal to the vehicle controller so that the current manual driving mode is maintained.

13. The apparatus according to claim 11, wherein when a current driving mode of the autonomous driving vehicle is a manual driving mode and when the APS signal is not generated in the accelerator pedal within the reference time after the tactile sensation signal is generated, the driving mode controller transmits the autonomous driving mode execution signal to the vehicle controller.

14. The apparatus according to claim 11, wherein when a current driving mode of the autonomous driving vehicle is an autonomous driving mode and when the APS signal is generated in the accelerator pedal within the reference time after the tactile sensation signal is generated, the driving mode controller transmits the manual driving mode execution signal to the vehicle controller.

15. The apparatus according to claim 11, wherein when a current driving mode of the vehicle mode is an autonomous driving mode and when the APS signal is not generated in the accelerator pedal within the reference time after the tactile sensation signal is generated, the driving mode controller transmits the autonomous driving mode execution signal to the vehicle controller wherein the current autonomous driving mode is maintained.

* * * * *